US007551789B2

(12) United States Patent  
Tu et al.

(10) Patent No.: US 7,551,789 B2
(45) Date of Patent: Jun. 23, 2009

(54) REVERSIBLE OVERLAP OPERATOR FOR EFFICIENT LOSSLESS DATA COMPRESSION

(75) Inventors: Chengjie Tu, Sammamish, WA (US); Henrique Sarmento Malvar, Sammamish, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/204,351

(22) Filed: Sep. 4, 2008

(65) Prior Publication Data

US 2008/0317368 A1    Dec. 25, 2008

Related U.S. Application Data

(63) Continuation of application No. 11/015,148, filed on Dec. 17, 2004, now Pat. No. 7,428,342.

(51) Int. Cl.
 *G06K 9/46*    (2006.01)
(52) U.S. Cl. ................. 382/248; 382/232; 382/233; 382/276
(58) Field of Classification Search ............ 382/232, 382/233, 248, 276, 166; 375/240.18, E7.026, 375/E7.226; 704/E19.004, E19.02, 230, 704/500
 See application file for complete search history.

(56) References Cited

U.S. PATENT DOCUMENTS

| | | | |
|---|---|---|---|
| 4,754,492 A | 6/1988 | Malvar | |
| 5,297,236 A | 3/1994 | Antill et al. | |
| 5,311,310 A | 5/1994 | Jozawa et al. | |
| 5,384,849 A | 1/1995 | Jeong | |
| 5,805,739 A | 9/1998 | Malvar et al. | |
| 5,822,000 A | 10/1998 | Yoon | |
| 5,850,294 A | 12/1998 | Apostolopoulos et al. | |
| 5,859,788 A | 1/1999 | Hou | |
| 5,933,522 A | 8/1999 | Kutka et al. | |
| 5,933,541 A | 8/1999 | Kutka et al. | |
| 5,970,173 A | 10/1999 | Lee et al. | |
| 5,973,755 A | 10/1999 | Gabriel | |
| 5,982,459 A | 11/1999 | Fandrianto et al. | |
| 6,011,625 A | 1/2000 | Glass | |
| 6,029,126 A | 2/2000 | Malvar | |
| 6,064,776 A | 5/2000 | Kikuchi et al. | |
| 6,073,153 A | 6/2000 | Malvar | |

(Continued)

FOREIGN PATENT DOCUMENTS

AU    7351001    1/2002

(Continued)

OTHER PUBLICATIONS

U.S. Appl. No. 60/341,674, filed Dec. 2001, Lee et al.

(Continued)

*Primary Examiner*—Anh Hong Do
(74) *Attorney, Agent, or Firm*—Klarquist Sparkman, LLP

(57) ABSTRACT

An efficient lapped transform is realized using pre- and post-filters (or reversible overlap operators) that are structured of unit determinant component matrices. The pre- and post-filters are realized as a succession of planar rotational transforms and unit determinant planar scaling transforms. The planar scaling transforms can be implemented using planar shears or lifting steps. Further, the planar rotations and planar shears have an implementation as reversible/lossless operations, giving as a result, a reversible overlap operator.

12 Claims, 10 Drawing Sheets

U.S. PATENT DOCUMENTS

| | | | |
|---|---|---|---|
| 6,101,279 | A | 8/2000 | Nguyen et al. |
| 6,115,689 | A | 9/2000 | Malvar |
| 6,154,762 | A | 11/2000 | Malvar |
| 6,219,458 | B1 | 4/2001 | Zandi et al. |
| 6,253,165 | B1 | 6/2001 | Malvar |
| 6,307,887 | B1 | 10/2001 | Gabriel |
| 6,324,560 | B1 | 11/2001 | Malvar |
| 6,370,502 | B1 | 4/2002 | Wu et al. |
| 6,393,061 | B1 | 5/2002 | Owechko |
| 6,393,156 | B1 | 5/2002 | Nguyen et al. |
| 6,421,464 | B1 | 7/2002 | Tran et al. |
| 6,487,574 | B1 | 11/2002 | Malvar |
| 6,496,795 | B1 | 12/2002 | Malvar |
| 6,728,315 | B2 | 4/2004 | Haskell et al. |
| 6,728,316 | B2 | 4/2004 | Enficiaud et al. |
| 6,763,068 | B2 | 7/2004 | Oktem |
| 6,771,828 | B1 | 8/2004 | Malvar |
| 6,771,829 | B1 | 8/2004 | Topiwala et al. |
| 6,865,229 | B1 | 3/2005 | Pronkine |
| 7,006,699 | B2 | 2/2006 | Malvar |
| 7,050,504 | B2 | 5/2006 | Joch et al. |
| 7,106,797 | B2 | 9/2006 | Malvar |
| 7,110,610 | B2 | 9/2006 | Malvar |
| 7,116,834 | B2 | 10/2006 | Malvar |
| 7,120,297 | B2 * | 10/2006 | Simard et al. ............... 382/166 |
| 7,155,065 | B1 | 12/2006 | Malvar |
| 7,167,522 | B2 | 1/2007 | Webb |
| 7,181,403 | B2 | 2/2007 | Wu et al. |
| 7,275,036 | B2 | 9/2007 | Geiger et al. |
| 7,315,822 | B2 * | 1/2008 | Li .............................. 704/500 |
| 7,460,993 | B2 * | 12/2008 | Chen et al. .................. 704/230 |
| 2002/0118759 | A1 | 8/2002 | Enficiaud et al. |
| 2003/0128756 | A1 | 7/2003 | Oktem |
| 2003/0152146 | A1 | 8/2003 | Lin |
| 2003/0185439 | A1 | 10/2003 | Malvar |
| 2003/0206582 | A1 | 11/2003 | Srinivasan |
| 2005/0013359 | A1 | 1/2005 | Srinivasan |
| 2006/0133684 | A1 | 6/2006 | Srinivasan et al. |

FOREIGN PATENT DOCUMENTS

| | | |
|---|---|---|
| EP | 0467054 B1 | 1/1992 |
| WO | WO 02/07438 | 1/2002 |

OTHER PUBLICATIONS

U.S. Appl. No. 60/488,710, filed Jul. 2003, Srinivasan et al.
Ahmed et al., "Discrete Cosine Transform," *IEEE Transactions on Computers*, C-23 (Jan. 1974), pp. 90-93.
Apostolopoulos et al., "Post-processing for very low bit-rate video compression," *IEEE Trans. Image Processing*, vol. 8, pp. 1125-1129 (Aug. 1999).
Bhaskaran et al., "Image and Video Compression Standards Algorithms and Architectures," 2nd ed., 1997, pp. 192-194.
de Queiroz et al., "Lapped transforms for image compression," *The Handbook on Transforms and Data Compression*, CRC Press, pp. 197-265 (Oct. 2000).
de Queiroz et al., "Time-Varying Lapped Transforms and Wavelet Packets," *IEEE Transactions on Signal Processing*, vol. 41, No. 12, pp. 3293-3305 (1993).
Goel et al., "Pre-processing for MPEG Compression Using Adaptive Spatial Filtering," *Proceedings of 1995 IEEE International Conference on Consumer Electronics*, 1995, pp. 246-247.
"H.264 & IPTV Over DSL—Enabling New Telco Revenue Opportunities," *White Paper*, Intel/Envivio, available at http://www.envivio.com/images/products/H264whitepaper.pdf (May 15, 2004).
ISO/IEC, "ISO/IEC 11172-2: Information Technology—Coding of Moving Pictures and Associated Audio for Storage Media at up to About 1.5 Mbit/s," 122 pp. (1993).
ISO/IEC, "Information Technology—Coding of Audio-Visual Objects: Visual, ISO/IEC 14496-2, Committee Draft," 330 pp. (1998).
ISO/IEC JTC1/SC29/WG11 N4668, "Coding of Moving Pictures and Audio," Title: MPEG-4 Overview—(V.21—Jeju Version), Editor: Rob Koenen (rob.koenen@m4if.org), available at http://www.chiariglione.org/mpeg/standards/mpeg-4/mpeg-4.htm (Mar. 2002).
ITU-T, "ITU-T Recommendation H.261: Video Codec for Audiovisual Services at $p$ x 64 kbits," 28 pp. (1993).
ITU-T, "ITU-T Recommedation H.262: Information Technology—Generic Coding of Moving Pictures and Associated Audio Information: Video," 218 pp. (1995).
ITU-T, "ITU-T Recommendation H.263: Video Codingk for Low Bit Rate Communication," 167 pp. (1998).
Jain, "Fundamentals of Digital Image Processing," Chapters 2, 5, and 11, Prentice Hall, 189 pp. (1989).
Joint Video Team (JVT) of ISO/IEC MPEG & ITU-T VCEG,"Joint Final Committee Draft (JFCD) of Joint Video Specification," JVT-D157, 207 pp. (Aug. 2002).
Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).
Malvar, "Lapped Transforms for Efficient Transform/Subband Coding," *IEEE Transactions on Acoustics, Speech and Signal Processing*, vol. 38, No. 6, pp. 969-978 (1990).
Malvar, "Signal Processing With Lapped Transforms," Norwood, MA: Artech House, pp. 175-219, 264-273, and 353-357 (1992).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mook, "Next-Gen Windows Media Player Leaks to the Web," *BetaNews*, 17 pp. (Jul. 19, 2002) [Downloaded from the World Wide Web on Aug. 8, 2003].
Paeth, "A Fast Algorithm for General Raster Rotation," *Proceedings of Graphics Interface '86*, pp. 77-81, May 1986.
Park et al., "A post processing method for reducing quantization effects in low bit-rate moving picture coding," *IEEE Trans. Circuits Syst.*, Video Technol., vol. 9, pp. 161-171 (Feb. 1999).
Printouts of FTP directories from http://ftp3.itu.ch, 8 pp. (downloaded from the World Wide Web on Sep. 20, 2005).
Proposed SMPTE Standard for Television: VC-1 Compressed Video Bitstream Format and Decoding Process, pp. 1-500, (Aug. 2005).
Rao et al., "Techniques and Standards for Image, Video, and Audio Coding," Englewood Cliffs, NJ: Prentice-Hall (1996).
Reader, "History of MPEG Video Compression—Ver. 4.0," 99 pp. (document marked Dec. 16, 2003).
Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).
Tanaka et al., "A Rotation Method for Raster Image Using Skew Transformation," *Proc IEEE Conf on Computer Vision and Pattern Recognition* pp. 272-277, Jun. 1986.
Tran et al., "Lapped Transform Based Video Coding," *Proc. SPIE Applicat. Digital Image Processing XXIV*, San Diego, CA, pp. 319-333 (Aug. 2001).
Tran, "Lapped Transform via Time-Domain Pre- and Post-Processing," *2001 Conference on Information Sciences and Systems*, The Johns Hopkins University (Mar. 21-23, 2001).
Tran et al., "Lapped Transform via Time-Domain Pre- and Post-Filtering," *IEEE Transactions on Signal Processing*, vol. 51, No. 6, pp. 1557-1571 (Jun. 2003).
Tu et al., "Context-Based Entropy Coding of Block Transform Coefficients for Image Processing," *IEEE Transactions on Image Processing*, vol. 11, No. 11, pp. 1271-1283 (Nov. 2002).
Wien, "Variable Block-Size Transforms for Hybrid Video Coding," Dissertation, 182 pp. (Feb. 2004).
Adams, "Generalized Reversible Integer-to-Integer Transform Framework," 2003 IEEE Pacific Rim Conference on Communications, Computers, and Signal Processing, vol. 2, Aug. 2003, pp. 1000-1003.
Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

Hao et al., "Matrix Factorizations for Reversible Integer Mapping," IEEE Transactions on Signal Processing, vol. 49, Issue 10, Oct. 2001, pp. 2314-2324.

International Search Report and Written Opinion for PCT/US06/30565, completed Apr. 15, 2007, 12 pp.

ISO/IEC 14496-2, "Coding of Audio-Visual Object—Part 2: Visual," Third Edition, pp. 1-727, (Jun. 2004).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Klausutis et al., "Variable Block Size Adaptive Lapped Transform-based Image Coding," 1997 International Conference on Image Processing (ICIP '97), vol. 3, pp. 686-689 (1997).

Malvar, "Fast Progressive Image Coding without Wavelets", IEEE Data Compression Conference, Snowbird, Utah, 10 pp. (Mar. 2000).

Malvar, "Signal Processing with Lapped Transforms," pp. 143-173, and 265-273 (1992).

Ostermann et al., "Video Coding with H.264/AVC", IEEE Circuits and Systems Magazine, First Quarter 2004 (retrieved on Apr. 14, 2007), retrieved from the internet URL:http://ieeexplore.ieee.org, 22 pp.

* cited by examiner

Software 1580 Implementing Reversible Overlap Operator

REVERSIBLE OVERLAP OPERATOR FOR EFFICIENT LOSSLESS DATA COMPRESSION

RELATED APPLICATION INFORMATION

This application is a continuation of Tu et al., U.S. patent application Ser. No. 11/015,148, entitled, "Reversible Overlap Operator For Efficient Lossless Data Compression," filed Dec. 17, 2004, which is hereby incorporated by reference.

TECHNICAL FIELD

The invention relates generally to digital media (e.g., video and image) compression using lapped transforms.

BACKGROUND

Lapped Transforms

The lapped transform is a powerful signal processing technique that is used in data compression. See, e.g., H. S. Malvar, *Signal Processing with Lapped Transforms*. Boston, Mass.: Artech House, 1992. However, to date, efficient lapped transforms with linear phase have neither been formulated nor been applied for lossless (reversible) compression of data.

As discussed in more detail below, it is known that a lapped transform can be formulated as a pre filter followed by a data transform (and its inverse as the inverse data transform followed by a post filter). See, e.g., H. S. Malvar, "A pre- and post-filtering technique for the reduction of blocking effects," in *Proc. Picture Coding Symposium*, Stockholm, Sweden, June 1987; and T. D. Tran, J. Liang, and C. Tu, "Lapped Transform via Time-Domain Pre- and Post-Filtering", *IEEE Trans. on Signal Processing*, vol. 51, no. 6, June 2003. A lossless data transform can be used in this formulation to achieve a good measure of reversibility. So far, it was believed that only a certain restricted variety of pre and post filters could be chosen for reversibility. This restricted set is very limited in its compression (rate vs. distortion, or R-D) performance. In a recent article (W. Dai and T. Tran, "Regularity-constrained pre- and post-filtering for block DCT--based systems," *IEEE Trans. on Signal Processing, vol.* 51, pp. 2568-2581, October 2003), a construction in which most elements are reversible and which has good compression properties was presented.

In audio compression, several constructions for reversible lapped transforms were introduced. See, e.g., R. Geiger, J. Herre, J. Koller, and K. Brandenburg, "IntMDCT—A link between perceptual and lossless audio coding," in *Proc. IEEE Int. Conf. on Acoustics, Speech, and Signal Processing*, Orlando, Fla., May 2002; and J. Li, "Reversible FFT and MDCT viva matrix lifting." in *Proc. IEEE Int. Conf. on Acoustics, Speech, and Signal Processing*, Montreal, Canada, May 2004. However, these constructions are applicable only to the modulated lapped transform (MLT), also known as modified discrete cosine transform (MDCT), whose basis functions are orthogonal and are not symmetric (that is, the basis functions are not linear phase). These transforms are not applicable to data compression applications where linear phase (symmetric) functions are required, such as in digital picture compression.

For picture (image) compression, one of the best-performing transforms in terms of R-D performance is the lapped biorthogonal transform (LBT). See, H. S. Malvar, "Biorthogonal and nonuniform lapped transforms for transform coding with reduced blocking and ringing artifacts," *IEEE Trans. on Signal Processing*, vol. 46, pp. 1043-1053, April 1998. Unlike the MLT, the LBT basis functions are symmetric, and are not exactly orthogonal (in the LBT, the analysis basis functions are orthogonal to the synthesis basis functions, hence the term biorthogonal). LBTs have been successfully used in image compression applications, but they have not yet been used in lossless image compression, because integer-reversible constructions were not known.

Overview of Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks. The DCT is described by N. Ahmed, T. Natarajan, and K. R. Rao, "Discrete Cosine Transform," *IEEE Transactions on Computers*, C-23 (January 1974), pp. 90-93. An exemplary implementation of the IDCT is described in "IEEE Standard Specification for the Implementations of 8x8 Inverse Discrete Cosine Transform," *IEEE Std.* 1180-1990, Dec. 6, 1990.

While compressing a still image (or an intra coded frame in a video sequence), most common standards such as MPEG-2, MPEG-4 and Windows Media partition the image into square tiles and apply a block transform to each image tile. The transform coefficients in a given partition (commonly known as block) are influenced only by the raw data components within the block. Irreversible or lossy operations on the encoder side such as quantization cause artifacts to appear in the decoded image. These artifacts are independent across blocks and produce a visually annoying effect known as the blocking effect. Likewise for audio data, when non-overlapping blocks are independently transform coded, quantization errors will produce discontinuities in the signal at the block boundaries upon reconstruction of the audio signal at the decoder. For audio, a periodic clicking effect is heard.

Several techniques are used to combat the blocking effect—the most popular among these are the deblocking filter that smoothes inter block edge boundaries, and spatial extrapolation that encodes differences between the raw input data and a prediction from neighboring block edges. These techniques are not without their flaws. For instance, the deblocking filter approach is "open loop", i.e. the forward transform process does not take into account the fact that deblocking is going to be performed prior to reconstruction on the decoder side. Besides, both these techniques are computationally expensive.

In order to minimize the blocking effect, cross block correlations can be exploited. One way of achieving cross block correlation is by using a lapped transform as described in H. Malvar, "Signal Processing with Lapped Transforms," Artech House, Norwood Mass., 1992. A lapped transform is a transform whose input spans, besides the data elements in the current block, a few adjacent elements in neighboring blocks. Likewise, on the reconstruction side the inverse transform influences all data points in the current block as well as a few data points in neighboring blocks.

For the case of 2-dimensional (2D) data, the lapped 2D transform is a function of the current block, together with select elements of blocks to the left, top, right, bottom and possibly top-left, top-right, bottom-left and bottom-right. The number of data points in neighboring blocks that are used to compute the current transform is referred to as the overlap.

Overview of the Spatial Domain Lapped Transform

The lapped transform can be implemented in the transform domain, as a step that merges transform domain quantities after a conventional block transform. Else, it can be implemented in the spatial-domain by a pre-processing stage that is applied to pixels within the range of overlap. These two implementations are mathematically related and therefore equivalent.

FIG. 2 shows an example of a conventional spatial-domain lapped transform. In the example shown, the overlap is 2 pixels, and two pixels each from the two adjacent blocks shown are pre-processed in pre-processing stage 210. Two pre-processed outputs are sent to each of the blocks for block transform-based coding by codec 100 as in FIG. 1. An inverse of the pre-processing stage is applied at post-processing stage 220 after decoding. With a judicious choice of pre-processing and block transform, a wide range of lapped transforms can be realized.

A key advantage of the spatial domain realization of the lapped transform is that an existing block transform-based codec can be retrofitted with a pre- and post-processing stage to derive the benefits of the lapped transform, i.e., reduced block effect and better compression, using an existing codec framework. Pre-processing 210 and post-processing can be represented as a matrix multiplication as shown in FIG. 3. Conventionally, the pre-processing and post-processing matrices are inverses of each other, i.e., pre-processing matrix ($P_f$) and the inverse or post-processing matrix ($P_i$) multiplied together equal the identity matrix I.

DEFINITIONS

In general, the length N of a transform is the number of transform coefficients in a certain transform block.

The support K of a transform is the number of input data points that influence coefficients of the transform block. Likewise, it is the number of output data points that are influenced by each transform coefficient, by the process of inverse transformation.

For typical block transforms such as the discrete cosine transform (DCT), the length and support are identical. However, lapped transforms (LTs) are an important class of transforms for which the support K is greater than the length N. The notation K×N is used to denote the support and length of a lapped transform. (Transforms for which K<N are expansive and therefore not used in data compression)

As an example 300, a 6×4 LT 310 shown in FIG. 3 is a transform with six inputs and four outputs. Since the transform is invertible, two of the inputs are shared with adjacent transform blocks. The inverse lapped transform (ILT) 320 produces six outputs from its four inputs. Output data points near the block boundary (in this case one point at each end of the block) are reconstructed by summing the corresponding responses of two adjacent inverse transform blocks.

Constraints On Lapped Transforms Used in Compression Systems

In the mathematical sense, lapped transforms are invertible structures, when we consider the input and output signals, as well as intermediate computation results, as real numbers. If infinite precision could be achieved, the input data could be perfectly recovered from its lapped transform coefficients. However, infinite precision is not possible in practice; for lossless compression of data, the requirement is to design a transform that operates on integer or fixed-precision arithmetic, yet perfectly reconstructs the data given the integer representation of transform coefficients. This is a stronger condition than mathematical invertibility, and such a transform is referred to here as a "lossless" transform. Moreover, it is required that the lossless transform be efficient for data compression (both lossless and lossy) as well. That efficiency can be measured by the entropy of the transformed data; the lower that entropy, the more the transformed data can be compressed by standard entropy coding techniques, such as context-based arithmetic coding or adaptive run-length coding.

SUMMARY

Various Realizations are described herein of an efficient lapped transform that is reversible in integer arithmetic, and can be used as the basis of an efficient and lossless data compression/decompression system.

It can be shown that the most efficient lossless transform designs (that is, those with minimum entropy of the transformed data) require the transform matrix be unit determinant (i.e., the determinant of the transform matrix is ±1). In the following description, it is assumed that the transform can be represented as a matrix multiplication, although it is recognized that there may be minor nonlinear phenomena such as data rounding. Thus, when we refer to the determinant, truncation or rounding aspects are not considered.

The efficient lapped transform is realized using pre- and post-filters that are referred to herein as "overlap operators". This realization is reversible, yet very R-D efficient. Among other applications, these new overlap operators allow the implementation of reversible LBTs, which can be used for lossless image compression. The pre- and post-filters use reversible operations. Further, the described overlap operators include simplifications for computational efficiency.

One realization of the pre and post filtering operations is as a succession of planar rotational transforms and unit determinant planar scaling transforms. Further, the planar rotations and planar shears have an implementation as reversible/lossless operations, giving as a result, a reversible overlap operator.

An exemplary application is in an 8×4 one-dimensional lapped transform realized using computationally efficient approximations of the reversible overlap operators.

Additional features and advantages of the invention will be made apparent from the following detailed description of embodiments that proceeds with reference to the accompanying drawings.

DETAILED DESCRIPTION

The following description relates to a digital media compression system or codec, which utilizes a reversible overlap operator for a lapped transform. For purposes of illustration, an embodiment of a compression system incorporating the reversible overlap operator is an image or video compression system. Alternatively, the reversible overlap operator also can be incorporated into compression systems or codecs for other 2D data. The reversible overlap operator does not require that the digital media compression system encodes the compressed digital media data in a particular coding format.

1. Encoder/Decoder

Figure 4:
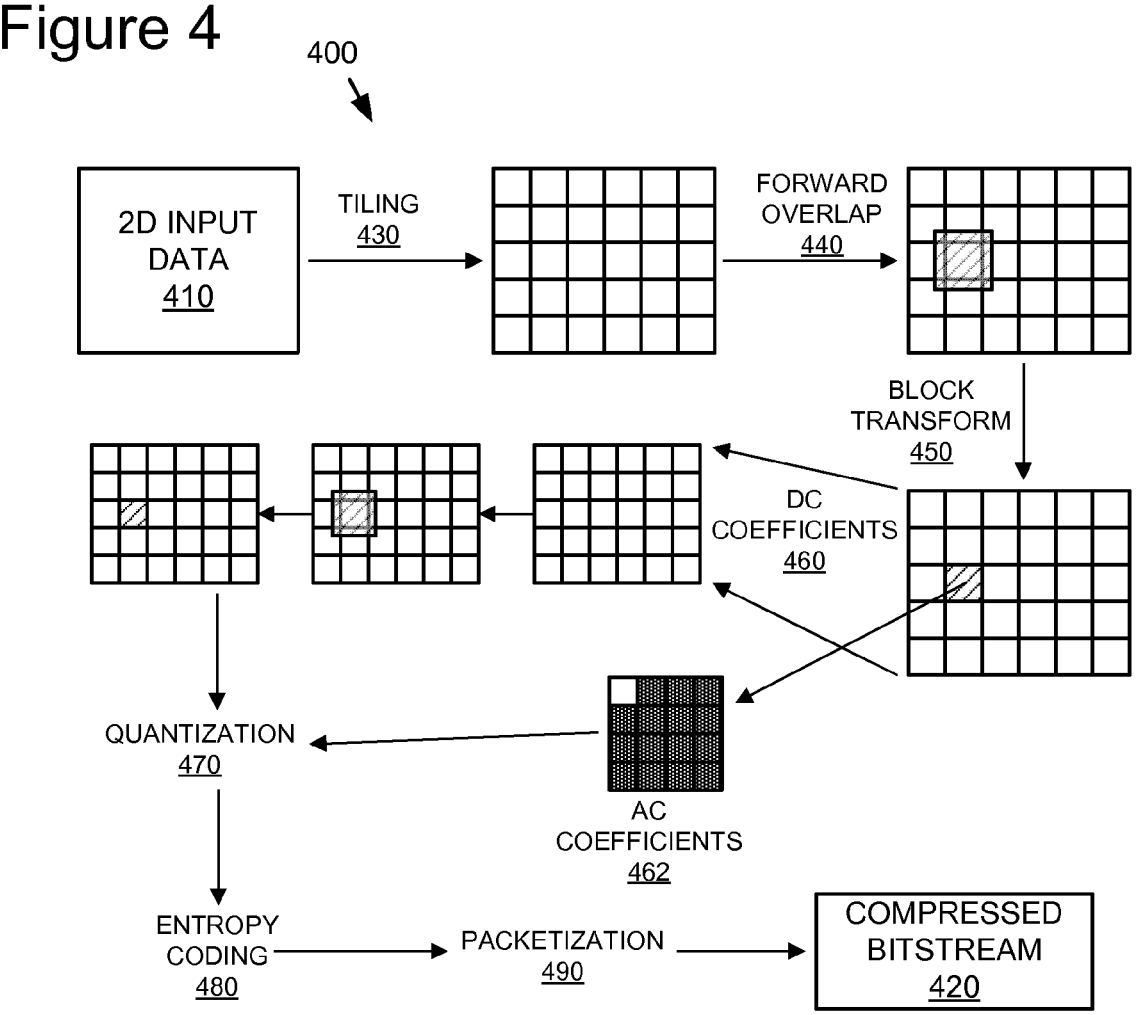
FIG. 4 is a flow diagram of an encoder based on a lapped transform utilizing a reversible overlap operator.
Figure 5:
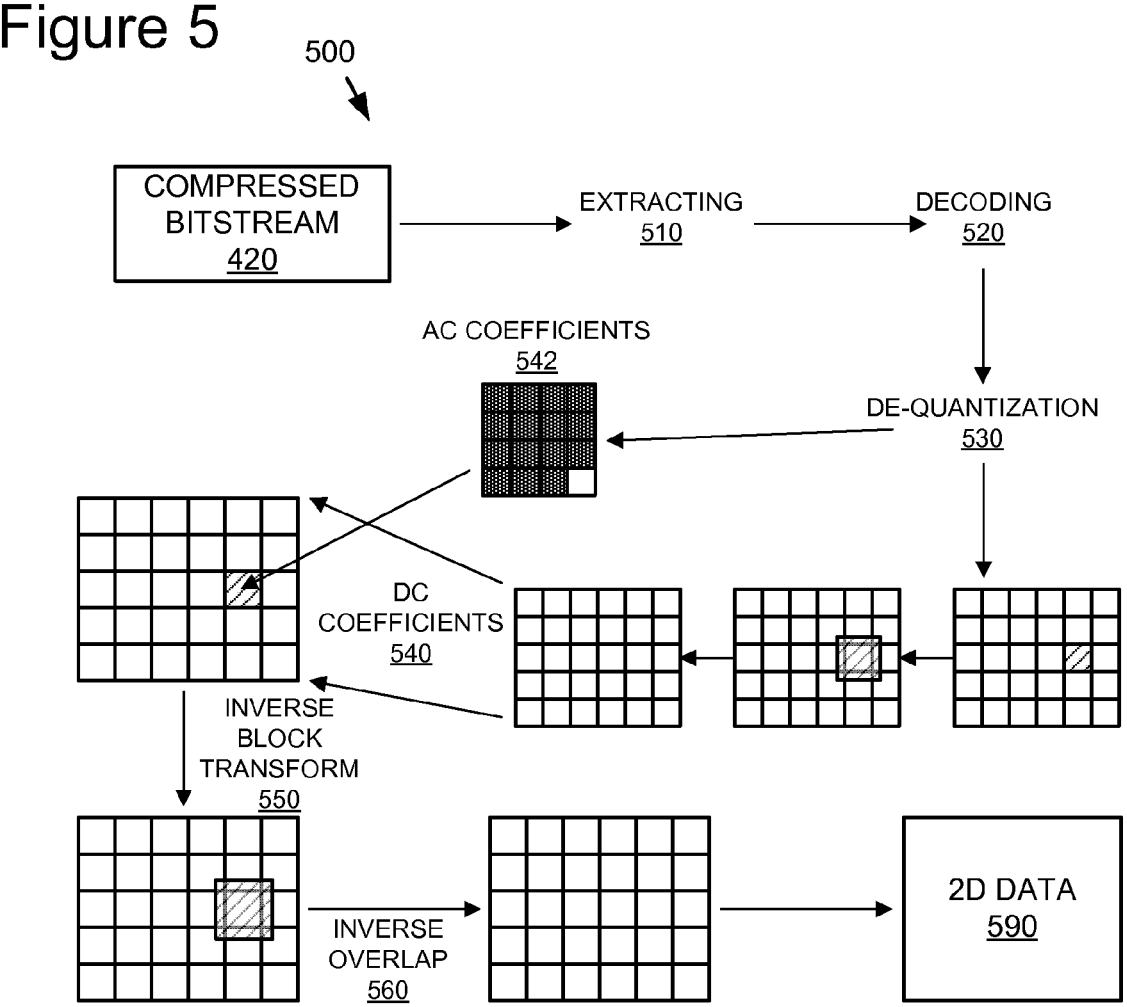
FIG. 5 is a flow diagram of an decoder based on the lapped transform.

FIGS. 4 and 5 are a generalized diagram of the processes employed in a representative 2-dimensional (2D) data encoder 400 and decoder 500 based on a lapped transform using the reversible overlap operator. The diagrams present a generalized or simplified illustration of the use and application of this reversible overlap operator in a compression system incorporating the 2D data encoder and decoder. In alternative encoders based on this reversible overlap operator, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 400 produces a compressed bitstream 420 that is a more compact representation (for typical input) of 2D data 410 presented as input to the encoder. For example, the 2D data input can be an image, a frame of a video sequence, or other data having two dimensions. The 2D data encoder tiles 430 the input data into macroblocks, which are 16×16 pixels in size in this representative encoder. The 2D data encoder further tiles each macroblock into 4×4 blocks 432. A "forward overlap" operator 440 is applied to each edge between blocks, after which each 4×4 block is transformed using a block transform 450. This block transform 450 can be the reversible, scale-free 2D transform described by Srinivasan, U.S. Patent Application entitled, "Improved Reversible Transform For Lossy And Lossless 2-D Data Compression," filed concurrently herewith, the disclosure of which is hereby incorporated by reference. Alternatively, the discrete cosine transform or other block transforms can be used with the reversible overlap operator described herein. Subsequent to the transform, the DC coefficient 460 of each 4×4 transform block is subject to a similar processing chain (tiling, forward overlap, followed by 4×4 block transform). The resulting DC transform coefficients and the AC transform coefficients are quantized 470, entropy coded 480 and packetized 490.

The decoder performs the reverse process. On the decoder side, the transform coefficient bits are extracted 510 from their respective packets, from which the coefficients are themselves decoded 520 and dequantized 530. The DC coefficients 540 are regenerated by applying an inverse transform, and the plane of DC coefficients is "inverse overlapped" using a suitable smoothing operator applied across the DC block edges. Subsequently, the entire data is regenerated by applying the 4×4 inverse transform 550 to the DC coefficients, and the AC coefficients 542 decoded from the bitstream. Finally, the block edges in the resulting image planes are inverse overlap filtered 560. This produces a reconstructed 2D data output.

2. Lapped Transform Realized Using Overlap Operators

Figure 1:
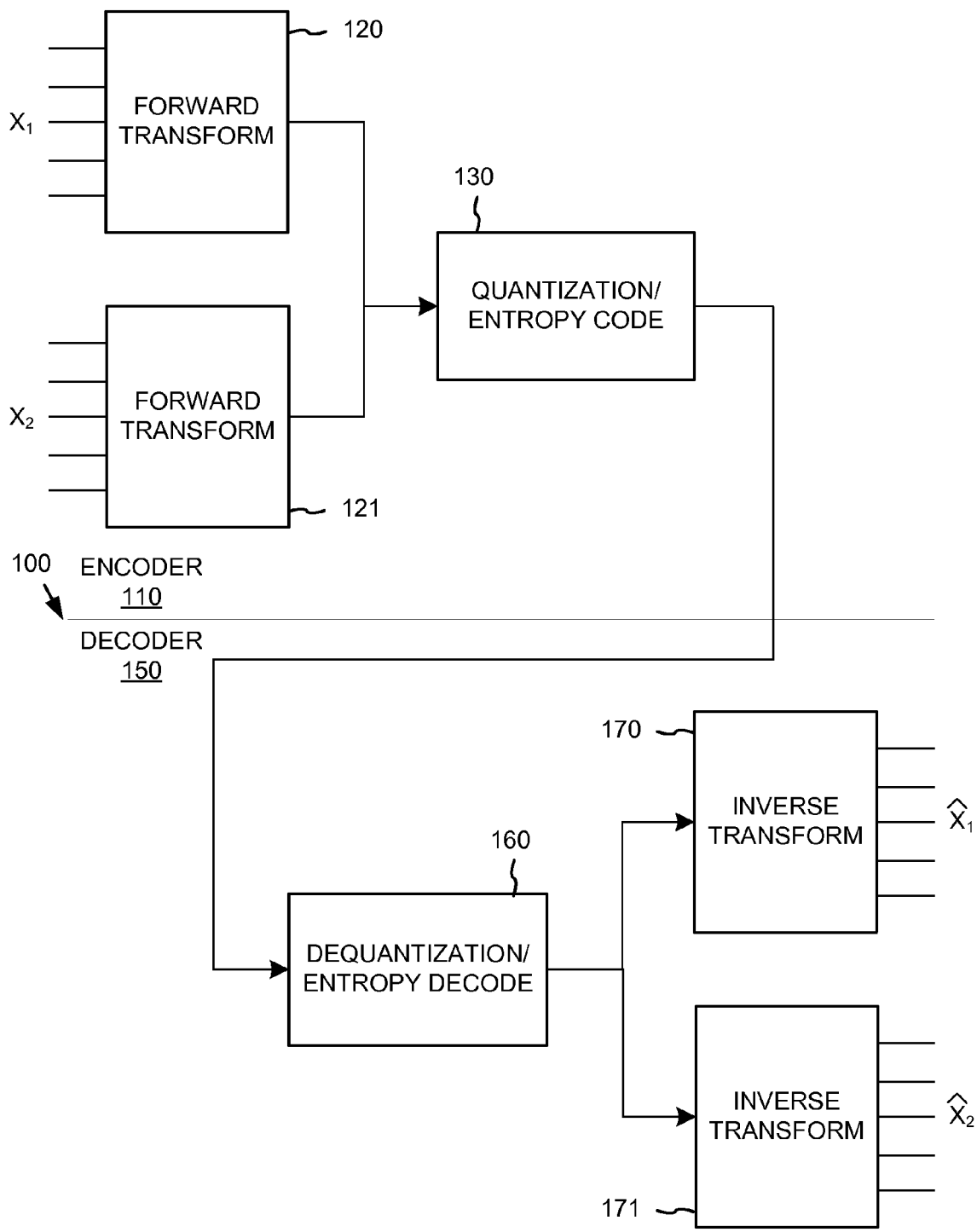
FIG. 1 is a block diagram of a conventional block transform-based codec in the prior art.
Figure 2:
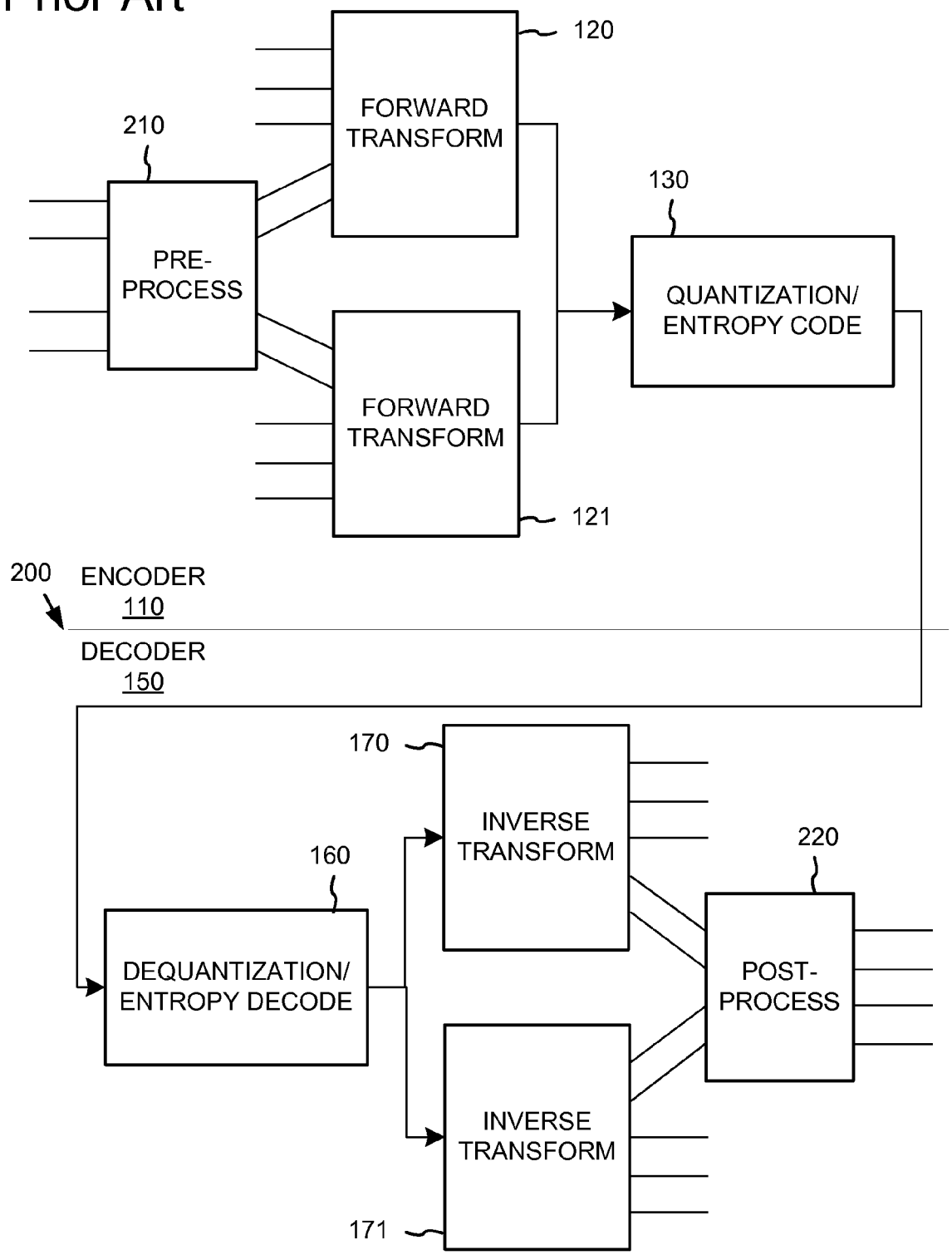
FIG. 2 is a block diagram of a spatial-domain lapped transform implemented as pre and post processing operations in combination with the block transform-based codec of FIG. 1, also in the prior art.
Figure 3:
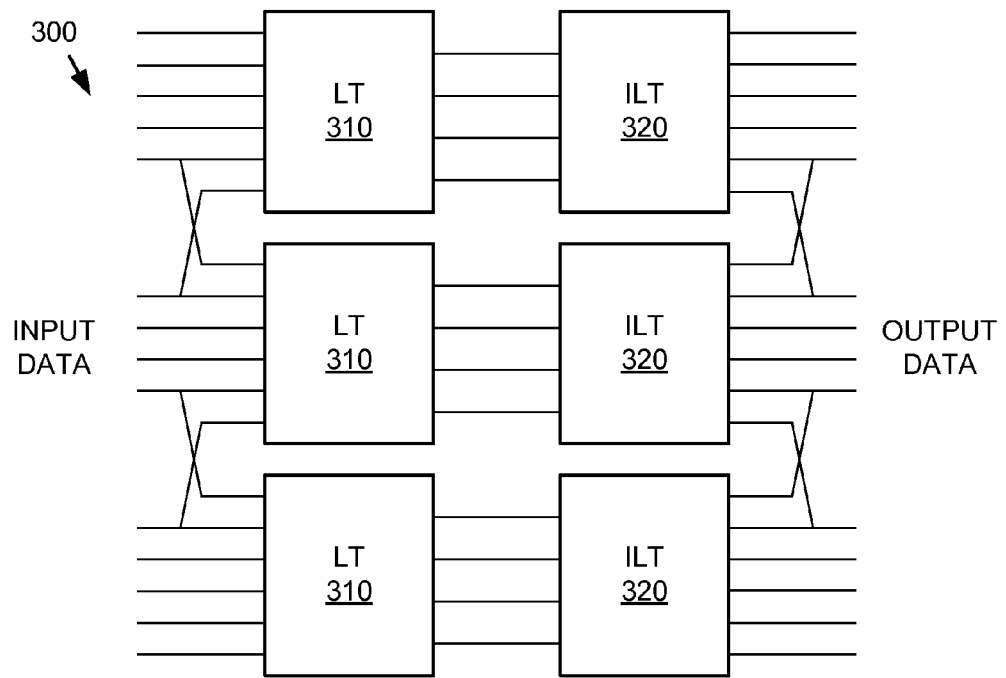
FIG. 3 is a block diagram illustrating a lapped transform and inverse lapped transform pair on 1-dimensional data.
Figure 6:
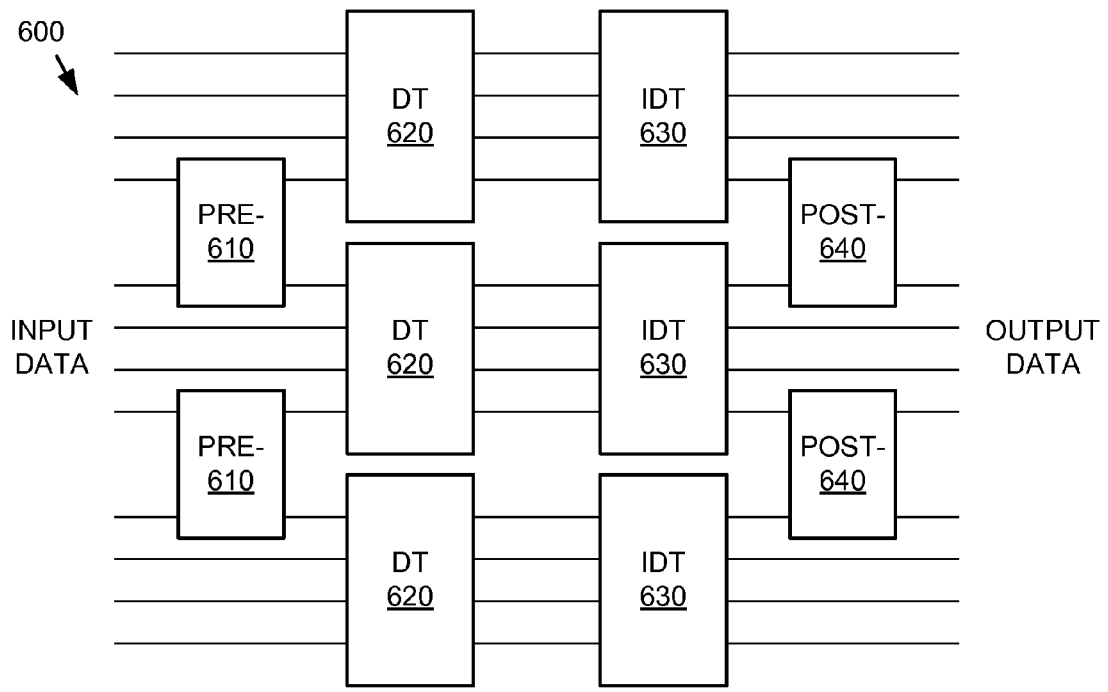
FIG. 6 is a block diagram illustrating a lapped transform and inverse lapped transform pair on 1-dimensional data using pre- and post-filtering operations (or reversible overlap operator) in conjunction with a block transform.

More generally, the overlap operator 440 and block transform 450 of the encoder 400 (FIG. 4) is an example of a large class of lapped transforms 600 that can be factorized into a pre filtering operation 610, followed by a block data transform 620 as illustrated in FIG. 6. FIG. 6 illustrates a generalized example of such factorized lapped transforms. In this illustrated case, the 6×4 lapped transform 310 shown in FIG. 3 is factorized into pre-filter operation 610 and block transform 620 stages. The pre filtering operation 610 and block transform 620 are evenly staggered over the data points. In this illustrated 6×4 lapped transform 600 example, each pre filter is a length 2 transformation of the data points straddling adjacent blocks. On the decode side, a post filter 640 is applied after the inverse block transform 630 across block boundaries. Likewise, for the general K×N case, the pre filter is applied to the (K−N)/2 data points of each block adjacent to a block boundary.

For invertibility, the pre-filter 610 and post filter 640 are inverses of each other. For realizing a lossless lapped transform, however, this condition is not sufficient. This further constrains the pre and post filters 610, 640 to be lossless transforms as well, in addition to the block (core) transform 620 to be realized in a lossless manner. The DCT can be realized in a lossless manner, using ladder, lattice-, or lifting-based methods, among others. See, e.g., A. A. M. L. Bruekens and A. W. M. van den Enden, "New networks for perfect inversion and perfect reconstruction", *IEEE J. Selected Areas Communications*, vol. 10, no. 1, 1992; and I. Daubechies and W. Sweldens, "Factoring wavelet transform into lifting steps", *J. Fourier Anal. Appl.*, vol. 4, pp. 247-269, 1998. A reversible, scale-free 2-dimensional transform also is described by Srinivasan, U.S. patent application entitled, "Improved Reversible Transform For Lossy And Lossless 2-D Data Compression," filed concurrently herewith and incorporated by reference herein. Lifting-based reversible approximations to the DCT in one dimension also are known. See, e.g., J. Liang and T. D. Tran, "Fast multiplierless approximations of the DCT with the lifting scheme," *IEEE Trans. Signal Processing*, vol. 49, pp. 3032-3044, December 2001.

Efficient reversibility further requires that both steps, viz. the pre/post filter and the block transform, be unit determinant.

3. Reversible Overlap Operator

Figure 7:
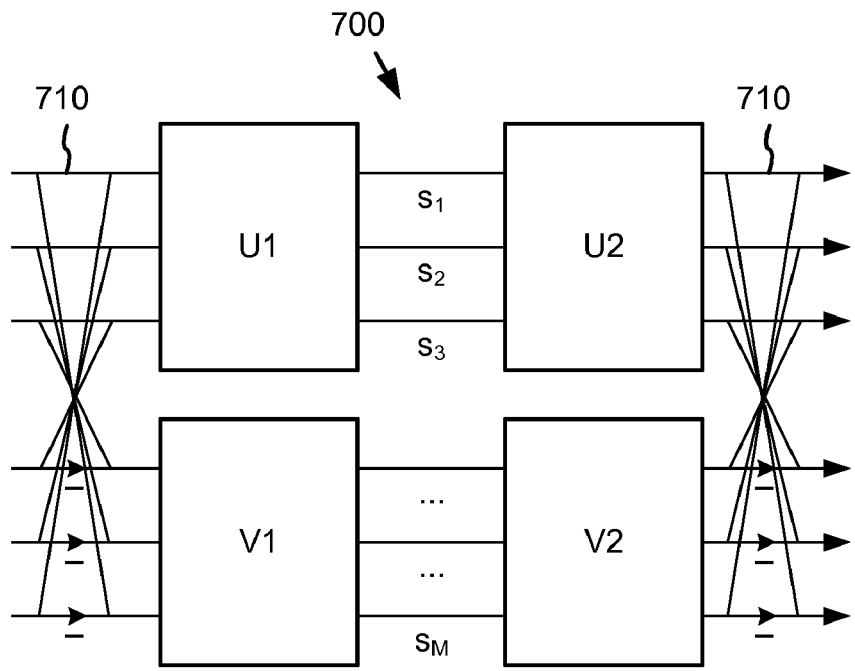
FIG. 7 is a signal flow graph illustrating a structure of a linear phase pre- (or post-) filter for use as the reversible overlap operator in the lapped transform of FIG. 6.

An efficient reversible overlap operator for use as the pre-filter 610 (FIG. 6) of the lossless lapped transform 600 on which the encoder 400/decoder 500 (FIGS. 4 and 5) is based can be realized as a linear phase pre-filter, which is factorized into the structure 700 shown in FIG. 7. An inverse of this pre-filter (i.e., the post-filter 640) also has the same structure but with different coefficients.

This linear phase filter structure 700 has multiple orthogonal components, including a cross-over Hadamard network 710 at its input and output. The internal arrows in the illustrated Hadamard network 710 denote negation in this diagram. The structure 700 further includes orthogonal matrices U1, U2, V1 and V2. These components can be implemented in a lossless manner by using lattice/lifting based methods.

In addition, the structure 700 has the nonzero scale factors $s_1$ through $s_M$. The unit determinant constraint implies that $$\prod_i s_i = \pm 1.$$

When all scale factors are ±1, the pre/post filters can be realized as a lossless transform where the component matrices U1, U2, V1 and V2 are implemented as lossless lattice/lifting steps. However, when scale factors are not all ±1, the lossless realization remains a challenge that is addressed as discussed more fully below.

With this linear phase pre-filter structure 700, the problem of realizing a lossless pre-/post-filter pair is reduced to the following three steps:

1. Decomposing the filter F into the following form, for orthogonal matrices U1, U2, V1 and V2:

$$F = \begin{pmatrix} I & J \\ \frac{J}{2} & -\frac{I}{2} \end{pmatrix} \begin{pmatrix} U_1 & 0 \\ 0 & V_1 \end{pmatrix} \begin{pmatrix} s_1 & & & \\ & s_2 & & \\ & & \ddots & \\ & & & s_M \end{pmatrix} \begin{pmatrix} U_2 & 0 \\ 0 & V_2 \end{pmatrix} \begin{pmatrix} \frac{I}{2} & J \\ \frac{J}{2} & -I \end{pmatrix} \quad (1)$$

where $I$ is the identity matrix and $$J = \begin{pmatrix} 0 & & 0 & 1 \\ 0 & & 1 & 0 \\ 0 & \ddots & & \\ 1 & & 0 & 0 \end{pmatrix};$$

2. Deriving lossless realizations for U1, U2, V1 and V2; and

3. Deriving a lossless realization for the scaling matrix.

As to step 1, the first and last matrices on the right hand side, which define 2 point Hadamard transforms, incorporate the factor of ½ in some terms to make these stages unit determinant. The rest is re-arranged to a block diagonal form with two blocks, each of half the linear dimensions of F. The singular value decomposition or SVD of each block provides the orthogonal matrices U1, U2, V1 and V2, as well as the scales.

The lossless realizations of the component matrices can be derived in Step 2 using standard lifting-based techniques, such as those described by A. A. M. L. Bruekens and A. W. M. van den Enden, "New networks for perfect inversion and perfect reconstruction", *IEEE J. Selected Areas Communications, vol.* 10, no. 1, 1992.

The lossless realization of the scaling matrix in Step 3 is addressed as follows. For simplicity, let us assume that we have a certain 2 input 2 output component that is (a) lossless and (b) realizes scaling by s ($0 \leq s \leq 1$) for the first component and by 1/s for the second component (other cases can be obtained by reverting the sign of one or both output signals). In other words, we have the input-output relationship given by $$y = \begin{pmatrix} s & 0 \\ 0 & \frac{1}{s} \end{pmatrix} x \quad (2)$$

Figure 8:
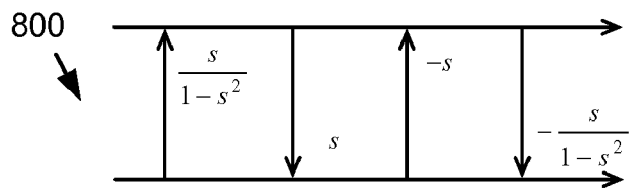
FIG. 8 is a signal flow graph of lossless scaling as four lifting steps for use in the reversible overlap operator.
Figure 9:
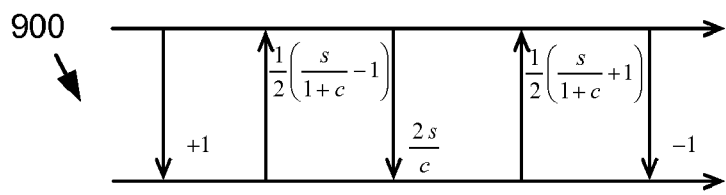
FIG. 9 is a signal flow graph of lossless scaling as five lifting steps for use in the reversible overlap operator.

The determinant of the transformation matrix in equation (2) is s/s=1. This matrix can be realized in four lifting steps procedure 800 or five lifting steps procedure 900 as shown in FIGS. 8 and 9. We usually approximate all the lifting steps in the form of y=(a.x+r)>>b, where x is the input and y is the output, and a, b, and r are integers and r is used for rounding error control, to get a division-less integer implementation. The transform defined by equation (2) is referred to here as the unit determinant scaling transform, abbreviated as the scaling transform.

Interestingly, the scaling transform is closely related with the shear operation, as defined below:

$$y = \begin{pmatrix} a & b \\ b & a \end{pmatrix} x \quad (3)$$

Under the constraint $a^2-b^2=1$ (a>0, b≧0), the shear operation has unit determinant and can be realized with three lifting steps:

$$\begin{pmatrix} a & b \\ b & a \end{pmatrix} = \begin{pmatrix} 1 & \sqrt{\frac{a-1}{a+1}} \\ 0 & 1 \end{pmatrix} \begin{pmatrix} 1 & 0 \\ b & 1 \end{pmatrix} \begin{pmatrix} 1 & \sqrt{\frac{a-1}{a+1}} \\ 0 & 1 \end{pmatrix}, \quad (4)$$

Therefore, $$\begin{bmatrix} a+b & 0 \\ 0 & a-b \end{bmatrix} = \begin{bmatrix} 1 & 1/2 \\ -1 & 1/2 \end{bmatrix} \begin{bmatrix} 1/2 & 0 \\ 0 & 1 \end{bmatrix} \begin{bmatrix} a & b \\ b & a \end{bmatrix} \begin{bmatrix} 2 & 0 \\ 0 & 1 \end{bmatrix} \begin{bmatrix} 1/2 & 1/2 \\ 1 & 1 \end{bmatrix} \quad (5)$$

$$= \begin{bmatrix} 1 & 0 \\ -1 & 1 \end{bmatrix} \begin{bmatrix} 1 & \frac{1}{2}\left(\sqrt{\frac{a-1}{a+1}}+1\right) \\ 0 & 1 \end{bmatrix} \begin{bmatrix} 1 & 0 \\ 2b & 1 \end{bmatrix}$$

$$\begin{bmatrix} 1 & \frac{1}{2}\left(\sqrt{\frac{a-1}{a+1}}+1\right) \\ 0 & 1 \end{bmatrix}$$

Here the scaling factors ½ and 2 in the matrices sandwiching the shear matrix are distributed to the shear lifting steps, and the last lifting step of the first matrix is combined with the first shear lifting step while the first lifting step of the last matrix is combined with the first shear lifting step. The five step realization as procedure 900 of the scaling transform shown in FIG. 9 is based on equation (5). Simplifications to the structure may be possible by canceling inverse operations, where possible, between the 3 groups in equation (1), viz the Hadamard networks, the orthogonal matrices, and the scaling operations (which may in turn be decomposed into Hadamard and shear operations).

More particularly, the effective transform matrix of the four lifting step realization of lossless scaling as procedure 800 is $$T = \begin{pmatrix} c^{-2} & 0 \\ 0 & c^2 \end{pmatrix}, \text{ where } c^2 = 1 - s^2.$$

On the other hand, the effective transform matrix of the five lifting step realization in procedure 900 is $$T = \begin{pmatrix} \frac{1+s}{c} & 0 \\ 0 & \frac{1-s}{c} \end{pmatrix}, \text{ where } c^2 = 1 - s^2.$$

Although the scaling procedure 800 shown in FIG. 8 has one fewer lifting step than the one in FIG. 9, the latter procedure 900 has only three non-trivial lifting steps as opposed to four in the former. For the reason stated in the above paragraph, the first or last trivial lifting step in FIG. 9 may be merged with prior or subsequent transform steps (for instance, with the Hadamard network 710 at either end of FIG. 7) under certain conditions (for instance when U1, U2 and V1 are identities).

Figure 10:
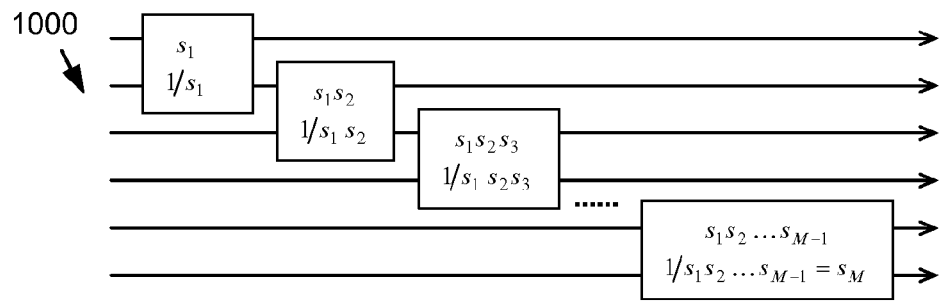
FIG. 10 is a signal flow graph of a cascade of 2-point scaling applied to a larger dimension matrix to realize lossless unit determinant scaling.

The scaling procedure can be easily extended to larger matrices. This is illustrated in FIG. 10, where M possibly different scale factors $s_1$ through $s_M$ are applied to the M data paths as a cascade 1000 of scaling transforms. In order to achieve this in a reversible manner, M−1 reversible scaling transforms are needed in general.

One useful special case is when the M scale factors $s_1$ through $s_M$ can be grouped into M/2 groups of form (s, 1/s). In this case, only M/2 reversible scaling transforms are needed. One example is $s_1=s_2=\ldots=s_{M/2}=s$ and $s_{M/2+1}=s_{M/2+2}=\ldots=s_M=1/s$. A preferred way of grouping is to maintain symmetry across the central axis, in other words each group scales the coefficients $s_i$ and $s_{M+1-i}$. If M is odd, the one scale factor not grouped is 1, corresponding to the data path along the axis.

On signal boundaries where pre/post filters need to extend outside of the signal, one solution is to extend the signal symmetrically and then apply pre/post filters. This is not a lossless operation in general because of the scaling. Another solution is to skip pre/post filtering on boundaries. There is no notable difference between the two solutions in terms of R-D performance as well as perceptual quality (for instance, if used for lossy image/video compression).

Figure 11:
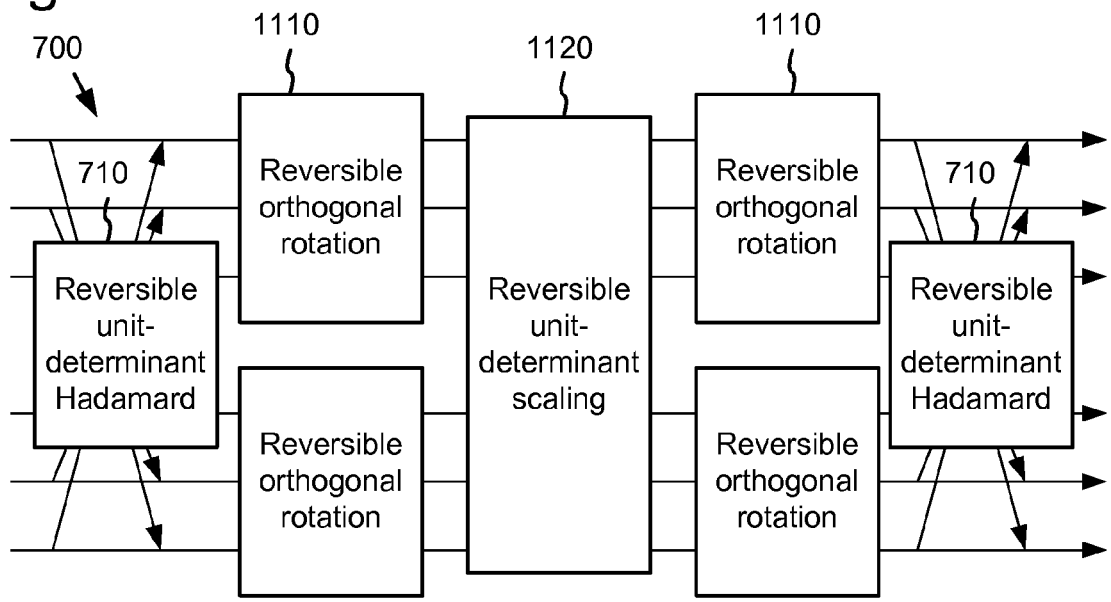
FIG. 11 is a signal flow graph of a reversible overlap operator (or pre-/post-filter) having the structure shown in FIG. 7 and using the lossless unit determinant scaling of FIG. 10.

Turning now to FIG. 11, the reversible overlap operator having the desired R-D efficient (i.e., unit determinant) property is then realized as a linear phase pre-filter structure 700 (FIG. 7) that includes reversible, unit-determinant Hadamard networks 710, reversible orthogonal rotations 1110 (for component matrices U1, U2, V1 and V2), and reversible unit-determinant scaling 1120 (e.g., using the lifting step procedures 800, 900 or cascade 1100). The post filter is analogous to the pre filter and is built using the same construction, albeit with inverse lifting steps in the reverse order. This is illustrated in FIG. 7, where the number of data values M in the block is in general any natural number. Although the illustration is for even valued M, odd values are also possible by noting that the "1 point Hadamard" transform of the center data value is itself. This procedure can be generalized to higher dimensional data.

Figure 12:
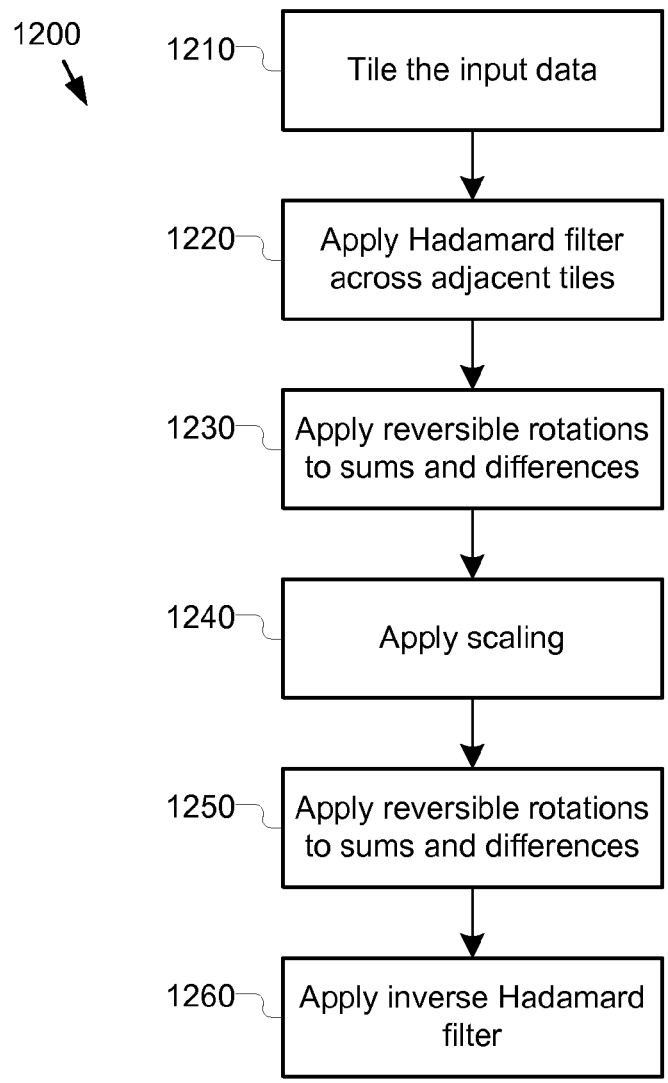
FIG. 12 is a flow chart of the operation of the reversible overlap operator of FIG. 11.

In summary, the operation of the reversible overlap operator is illustrated in FIG. 12. In a first step 1210, the input 2-dimensional digital media data is tiled into blocks (as also shown for the encoder 400 in FIG. 4). The reversible overlap operator applies a Hadamard network 710 across adjacent tiles at step 1220. The operator then applies reversible rotations to sums and differences at step 1230, followed by the reversible scaling operator at step 1240. This is followed by another reversible block rotation (step 1250), and reversible inverse Hadamard network (step 1260).

Figure 13:
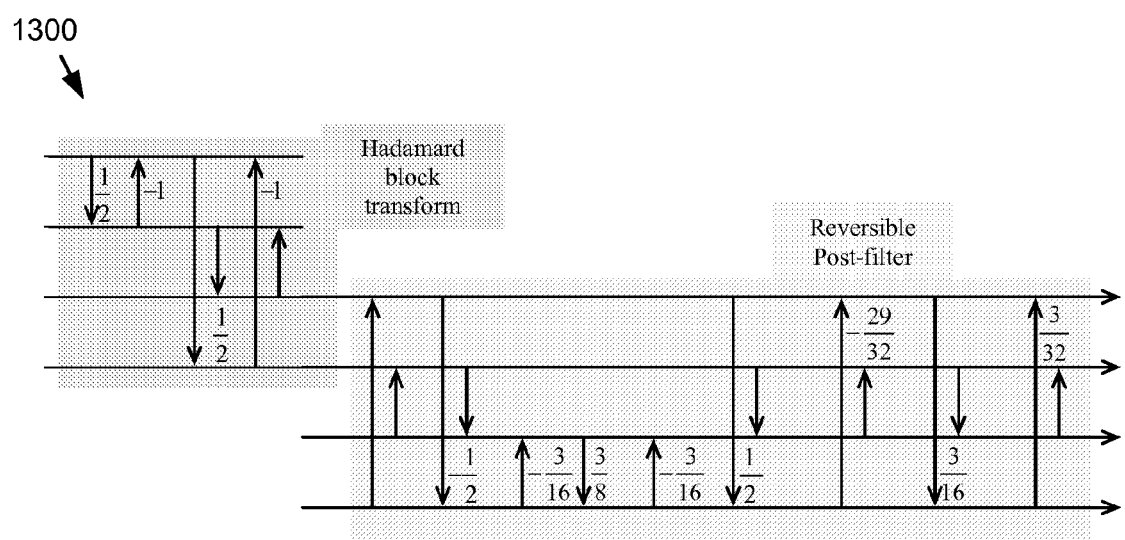
FIG. 13 is a signal flow graph illustrating an example of a reversible lapped transform implementation using the reversible overlap operator of FIG. 11.

With reference now to FIG. 13, the matrix representations of the reversible block rotations and scaling operators depend upon the desired lapped operator using for instance the arithmetic described in equation (1). FIG. 13 shows an example of a post-filter having the structure 700 shown in FIGS. 7 and 11, which is preceded by a reversible block transform (4 point Hadamard transform in this case). The transfer function of the post-filter is:

$$T = \begin{pmatrix} 0.9885 & 0.1553 & -0.1553 & 0.2183 \\ -0.1499 & 0.9885 & 0.2183 & 0.1499 \\ 0.1502 & 0.2167 & 0.9884 & -0.1502 \\ 0.2167 & -0.1556 & 0.1556 & 0.9884 \end{pmatrix} \quad (6)$$

Figure 14:
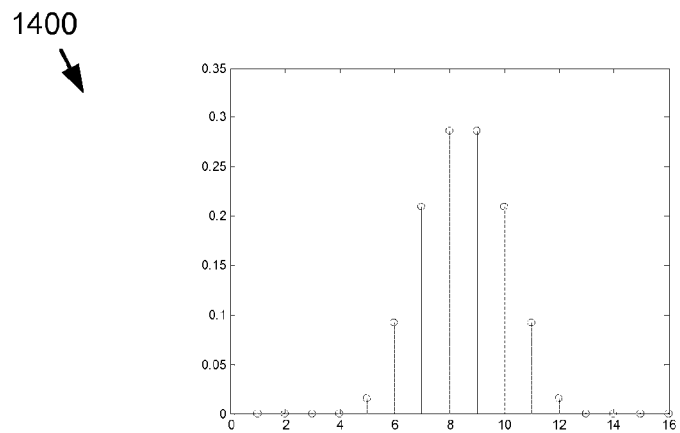
FIG. 14 is an impulse response graph of the DC coefficient of the example lapped transform of FIG. 13.

The low pass component of the Hadamard produces the impulse response shown in the graph in FIG. 14.

4. Computing Environment

The above described codec based on a lapped transform using a reversible overlap operator can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 15.

Figure 15:
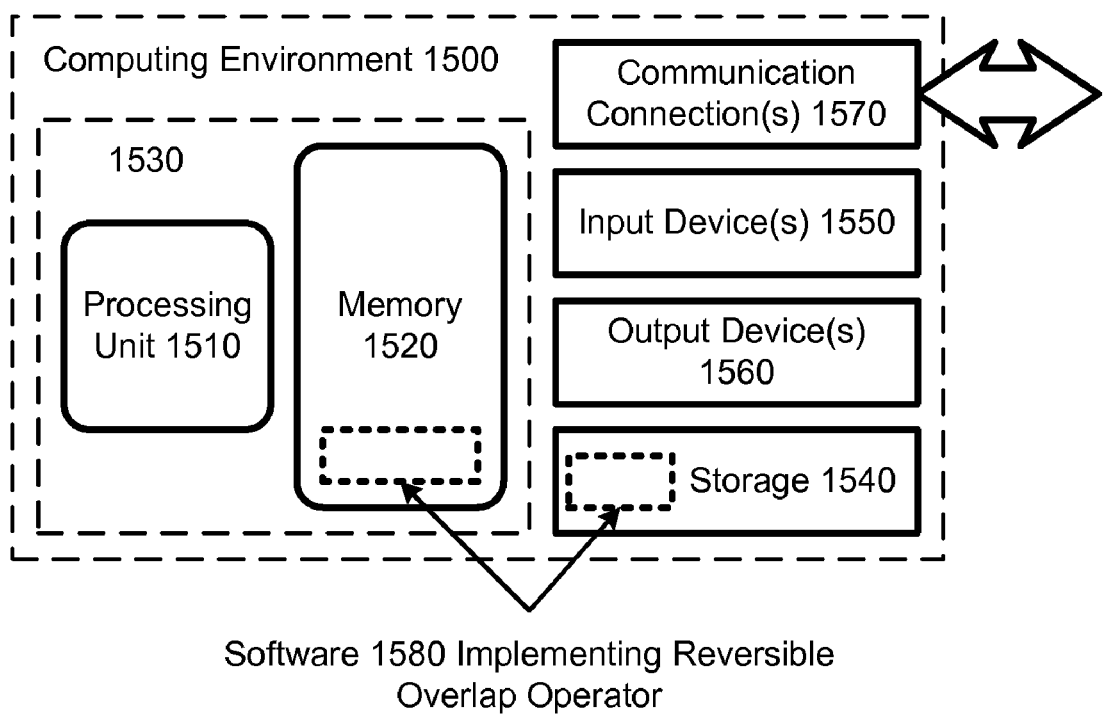
FIG. 15 is a block diagram of a suitable computing environment for implementing the block transform-based codec with improved spatial-domain lapped transform of FIGS. 4 and 5.

FIG. 15 illustrates a generalized example of a suitable computing environment (1500) in which described embodiments may be implemented. The computing environment (1500) is not intended to suggest any limitation as to scope of use or functionality of the invention, as the present invention may be implemented in diverse general-purpose or special-purpose computing environments.

With reference to FIG. 15, the computing environment (1500) includes at least one processing unit (1510) and memory (1520). In FIG. 15, this most basic configuration (1530) is included within a dashed line. The processing unit (1510) executes computer-executable instructions and may be a real or a virtual processor. In a multi-processing system, multiple processing units execute computer-executable instructions to increase processing power. The memory (1520) may be volatile memory (e.g., registers, cache, RAM), non-volatile memory (e.g., ROM, EEPROM, flash memory, etc.), or some combination of the two. The memory (1520) stores software (1580) implementing the described encoder/decoder and transforms.

A computing environment may have additional features. For example, the computing environment (1500) includes storage (1540), one or more input devices (1550), one or more output devices (1560), and one or more communication connections (1570). An interconnection mechanism (not shown) such as a bus, controller, or network interconnects the components of the computing environment (1500). Typically, operating system software (not shown) provides an operating environment for other software executing in the computing environment (1500), and coordinates activities of the components of the computing environment (1500).

The storage (1540) may be removable or non-removable, and includes magnetic disks, magnetic tapes or cassettes, CD-ROMs, CD-RWs, DVDs, or any other medium which can be used to store information and which can be accessed within the computing environment (1500). The storage (1540) stores instructions for the software (1580) implementing the codec based on a lapped transform using the reversible overlap operator.

The input device(s) (1550) may be a touch input device such as a keyboard, mouse, pen, or trackball, a voice input device, a scanning device, or another device that provides input to the computing environment (1500). For audio, the input device(s) (1550) may be a sound card or similar device that accepts audio input in analog or digital form, or a CD-ROM reader that provides audio samples to the computing environment. The output device(s) (1560) may be a display, printer, speaker, CD-writer, or another device that provides output from the computing environment (1500).

The communication connection(s) (1570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1500), computer-readable media include memory (1520), storage (1540), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

5. Variations And Extensions of the Reversible Overlap Operator

Various modifications and extensions of the above described reversible overlap operator can be made. Although the descriptions presented above are for one dimensional data, the same procedure may be applied separably, or non-separably to multiple data dimensions.

The orthogonal rotations in the above described reversible overlap operator implementation may be replaced by approximations thereof, or by other transforms which may not be orthogonal.

Furthermore, although the primary focus in the above description has been on the lossless recovery of input data, the same transform may be used for lossy data compression as well. In this case, the loss may occur either in the quantization process, or due to a limited precision/approximate implementation of either pre filter or post filter, or due to other inaccuracies, or a combination of multiple factors.

The reversible overlap operator described here may be applied to domains outside of data-compression. The lapped transform using the reversible overlap operator may itself be expansive.

The reversible overlap operator may be applied, in appropriately modified form, to implement multirate filter banks, wavelets, lapped transforms with support spanning more than 2 block widths (K>2 N).

The reversible overlap operator may be applied in a spatially varying manner, in which the extent and shape of overlap filter may vary across the spatial extent of the data.

In view of the many possible embodiments to which the principles of our invention may be applied, we claim as our invention all such embodiments as may come within the scope and spirit of the following claims and equivalents thereto.

We claim:

1. A method of coding image data for compression, the method comprising:
   using an encoder for
   processing the image data using a lapped transform applied to blocks of the image data, wherein said processing using a lapped transform comprises, in part:
   processing a set of four points of image data straddling a block boundary using a four point overlap operator implemented by performing operations on first through fourth signal paths, said operations comprising at least:
      first lifting steps having a coefficient of one of the fourth signal path into the first signal path, and of the second signal path into the third signal path,
      second lifting steps having a coefficient of negative one half of the first signal path into the fourth signal path, and of the third signal path into the second signal path,
      third lifting steps having a coefficient of one half of the first signal path into the fourth signal path, and of the second signal path into the third signal path,
      fourth lifting steps having a coefficient of negative twenty-nine thirty-seconds of the fourth signal path into the first signal path, and of the third signal path into the second signal path,
      fifth lifting steps having a coefficient of three sixteenths of the first signal path into the fourth signal path, and of the second signal path into the third signal path,
      sixth lifting steps having a coefficient of three thirty-seconds of the fourth signal path into the first signal path, and of the third signal path into the first signal path;
   encoding coefficients produced by said processing using the lapped transform into a bitstream; and
   outputting the bitstream.

2. The method of claim 1, wherein said operations of the four point overlap operator further comprise a rotation operation between the third and fourth signal paths.

3. The method of claim 1, wherein said operations of the four point overlap operator further comprise a scaling operation between the third and fourth signal paths.

4. The method of claim 1, wherein said operation of the four point overlap operator further comprise at least:
   a lifting step having a coefficient of negative three sixteenths of the fourth signal path into the third signal path;
   a lifting step having a coefficient of three eighths of the third signal path into the fourth signal path; and
   a lifting step having a coefficient of negative three sixteenths of the fourth signal path into the third signal path.

5. A method of decoding image data from a compressed bitstream, the method comprising:
   using a decoder for
   decoding lapped transform coefficients from the compressed bitstream;
   processing the lapped transform coefficients using an inverse block transform to reconstruct blocks of image data, wherein said processing using an inverse block transform comprises, in part:
   processing a set of four points of the transform coefficients straddling a block boundary using a four point inverse overlap operator implemented by performing inverses in reverse order of operations on first through fourth signal paths, said operations comprising at least:
      first lifting steps having a coefficient of one of the fourth signal path into the first signal path, and of the second signal path into the third signal path,
      second lifting steps having a coefficient of negative one half of the first signal path into the fourth signal path, and of the third signal path into the second signal path,
      third lifting steps having a coefficient of one half of the first signal path into the fourth signal path, and of the second signal path into the third signal path, fourth lifting steps having a coefficient of negative twenty-nine thirty-seconds of the fourth signal path into the first signal path, and of the third signal path into the second signal path, fifth lifting steps having a coefficient of three sixteenths of the first signal path into the fourth signal path, and of the second signal path into the third signal path, sixth lifting steps having a coefficient of three thirty-seconds of the fourth signal path into the first signal path, and of the third signal path into the first signal path; and producing an image from the image data for presentation on a display.

6. The method of claim 5, wherein said operations further comprise a rotation operation between the third and fourth signal paths.

7. The method of claim 5, wherein said operations further comprise a scaling operation between the third and fourth signal paths.

8. The method of claim 5, wherein said operations further comprise at least:
- a lifting step having a coefficient of negative three sixteenths of the fourth signal path into the third signal path;
- a lifting step having a coefficient of three eighths of the third signal path into the fourth signal path; and
- a lifting step having a coefficient of negative three sixteenths of the fourth signal path into the third signal path.

9. A decoder device for decoding image data from a compressed bitstream, the decoder comprising:
- a digital signal processor operating to decode lapped transform coefficients from the compressed bitstream, and to process the lapped transform coefficients using an inverse block transform to reconstruct blocks of image data, wherein processing using the inverse block transform comprises, in part:
  - processing a set of four points of the transform coefficients straddling a block boundary using a four point inverse overlap operator implemented by performing inverses in reverse order of operations on first through fourth signal paths, said operations comprising at least:
    - first lifting steps having a coefficient of one of the fourth signal path into the first signal path, and of the second signal path into the third signal path,
    - second lifting steps having a coefficient of negative one half of the first signal path into the fourth signal path, and of the third signal path into the second signal path,
    - third lifting steps having a coefficient of one half of the first signal path into the fourth signal path, and of the second signal path into the third signal path,
    - fourth lifting steps having a coefficient of negative twenty-nine thirty-seconds of the fourth signal path into the first signal path, and of the third signal path into the second signal path,
    - fifth lifting steps having a coefficient of three sixteenths of the first signal path into the fourth signal path, and of the second signal path into the third signal path,
    - sixth lifting steps having a coefficient of three thirty-seconds of the fourth signal path into the first signal path, and of the third signal path into the first signal path; and
- a display for presenting an image from the reconstructed blocks of image data.

10. The decoder device of claim 9, wherein said operations further comprise a rotation operation between the third and fourth signal paths.

11. The decoder device of claim 9, wherein said operations further comprise a scaling operation between the third and fourth signal paths.

12. The decoder device of claim 9, wherein said operations further comprise at least:
- a lifting step having a coefficient of negative three sixteenths of the fourth signal path into the third signal path;
- a lifting step having a coefficient of three eighths of the third signal path into the fourth signal path; and
- a lifting step having a coefficient of negative three sixteenths of the fourth signal path into the third signal path.

* * * * *